Figure 1:
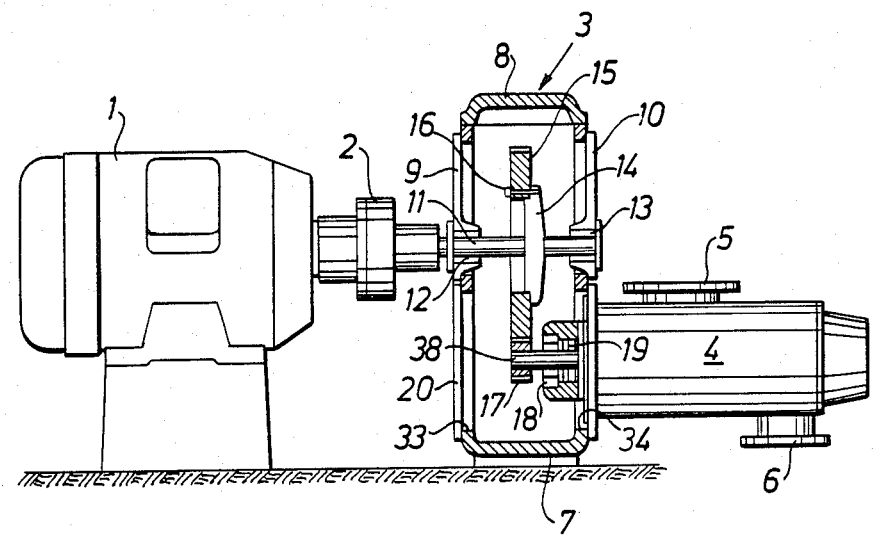

United States Patent [19]

Van Hee

[11] Patent Number: 4,524,638
[45] Date of Patent: Jun. 25, 1985

[54] GEAR BOX FOR A COMPRESSOR PLANT
[75] Inventor: Michel A. J. Van Hee, Kontich, Belgium
[73] Assignee: Atlas Copco Aktiebolag, Nacka, Sweden
[21] Appl. No.: 499,852
[22] Filed: Jun. 1, 1983
[30] Foreign Application Priority Data Jun. 7, 1982 [SE] Sweden .................. 8203504

[51] Int. Cl.³ .............................. F16N 57/02
[52] U.S. Cl. ..................... 74/606 R; 74/665 GA; 403/4
[58] Field of Search ......... 74/606 R, 665 G, 665 GA; 29/469, 434; 403/3, 4

[56] References Cited

U.S. PATENT DOCUMENTS

| 1,720,971 | 7/1929 | Schweich | 74/325 |
|---|---|---|---|
| 2,436,746 | 2/1948 | Drought | 74/325 |
| 2,581,973 | 1/1952 | Schaffer | 74/606 R X |
| 2,600,912 | 6/1952 | Olson | 74/325 X |
| 2,669,881 | 2/1954 | Skidmore | 74/325 |
| 3,029,661 | 4/1962 | Schmitter | 74/606 R |
| 3,150,533 | 9/1964 | Wallgren | 74/606 R X |
| 3,698,265 | 10/1972 | Williams | 74/606 R X |
| 3,783,710 | 1/1974 | Steinhagen | 74/606 R X |
| 3,888,134 | 6/1975 | Miranda | 74/606 R X |

Primary Examiner—Allan D. Herrmann
Assistant Examiner—Joseph M. Rolnicki
Attorney, Agent, or Firm—Eric Y. Munson

[57] ABSTRACT

A gear box for a compressor plant. The gear box (3) is provided with mounting flanges (34,33) of different sizes for a compressor stage (4) on two opposite sides (36,37). The flange not used for the mounting of a compressor stage is used as an access opening through which bearings (18) and seals (19) can be taken away from the compressor stage while leaving the stage mounted on the gear box with all conduits connected.

2 Claims, 7 Drawing Figures

GEAR BOX FOR A COMPRESSOR PLANT

The present invention relates to a gear box for a compressor plant. The invention is particularly suitable for gas compressor plants. The term gas compressor as used in the present application and elsewhere refers to a compressor for the compressing of gases other than air within the process industry.

According to prior art the compressor stage is mounted on a gear box. In order to reach bearings and seals for inspection and possible replacement it has up to now been necessary to dismount the compressor stage. This means disconnecting and later reconnecting all the conduits to and from the compressor stage. This is particularly time-consuming when the working medium is an aggressive or dangerous gas because then the tightness of the installation must be checked very carefully before the plant is taken into operation again. Another drawback with present gear boxes is that each of them can be used only with one set of compressor stages or with a very limited range of compressor sizes at most.

The present invention solves the above mentioned problems by creating a gear box which can be used for a large range of compressor capacities. It also makes it possible to inspect and if necessary replace bearings and seals on the compressor stage without dismounting the stage from the gear box and thus without disconnecting any conduits to or from the compressor stage.

The present invention, which is defined by the appended claims, is mainly characterized by the provision of mounting means, having different sizes, for a compressor stage on two opposite sides of the gear box. These mounting means also have sizes being sufficient for removal of bearings and seals from a shaft of a compressor stage mounted on the opposite side. The mounting means are used alternatively. The mounting means not used for the mounting of a compressor stage is used as an access opening to the compressor stage. The opening is covered during operation of the compressor plant.

Figure 2:
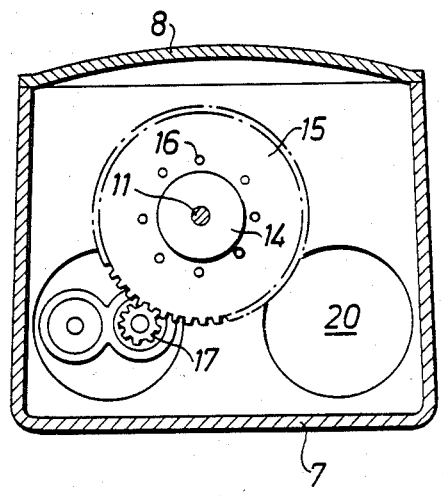
Figure 3:
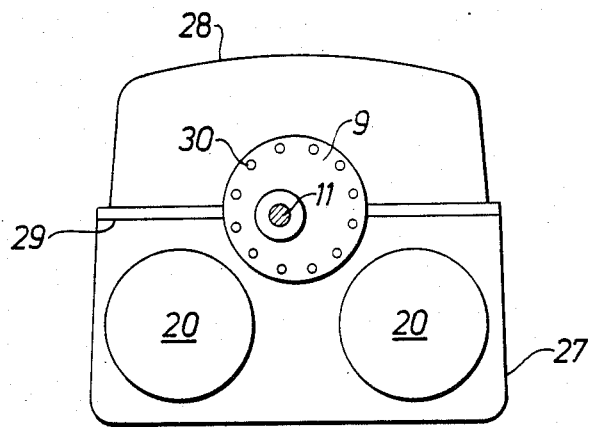
Figure 4:
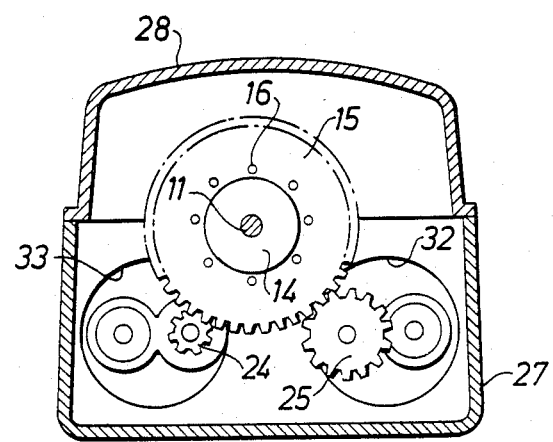
Figure 5:
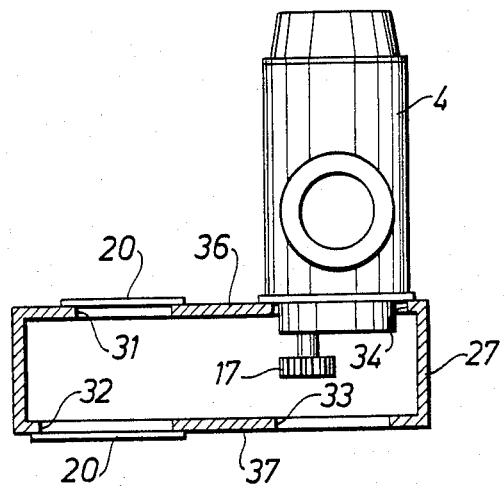
Figure 6:
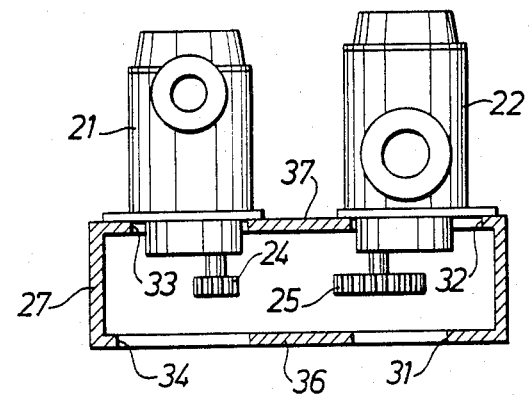
Figure 7:
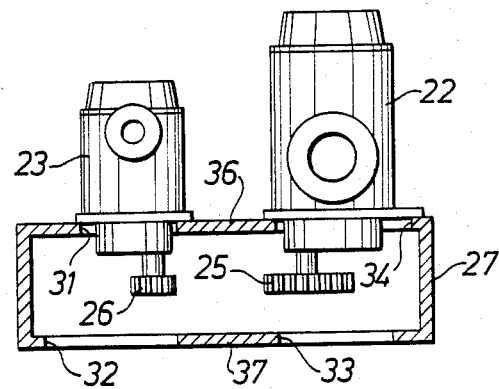

The invention is exemplified below with reference to the accompanying drawings in which FIG. 1 shows a compressor plant.
FIG. 2 shows a section through a gear box in FIG. 1.
FIG. 3 shows a second embodiment of the gear box.
FIG. 4 shows a section through the gear box of FIG. 3.
FIGS. 5-7 show the gear box with compressor stages mounted in different configurations.

The compressor plant shown in FIG. 1 comprises a drive motor 1, which by means of a coupling 2 is connected to a gear box 3. A compressor stage 4 having an inlet 5 and an outlet 6 is attached to the gear box. Gear box 3 comprises a lower part 7 and an upper part 8. The gear box is provided with mounting plates 9, 10 is which a shaft 11 is journalled by means of bearings 12, 13. A driving gear wheel comprising a hub 14 and a gear ring 15 is mounted on shaft 11 and is thus connected to drive motor 1. Gear ring 15 is secured to hub 14 by means of screws 16. Compressor stage 4 is provided with a driven gear wheel 17 which is mounted on a shaft 38 through which the compressor stage is driven. Shaft 38 is journalled in bearings 18 and provided with seals 19. Compressor stage 4 is mounted on mounting means 34 which comprises the rim of a hole having the same reference numeral. The rim may be provided with a number of threaded holes for receiving screws by means of which the compressor stage is secured to the gear box. Opposite mounting means 34 the gear box is provided with a mounting means or access opening 33. Mounting means 33 is, during operation of the compressor plant covered by a cover plate 20.

The gear box shown in FIGS. 3 and 4 comprises a lower part 27 and an upper part 28 which are joined at a dividing plane 29. Mounting plate 9, and mounting plate 10, are secured both to part 27 and to part 28 by means of screws 30. As seen in FIG. 4 the driving gear wheel 15 cooperates with two driven gear wheels 24, 25. The corresponding compressor stages are mounted on mounting means 32, 33 which have fixed positions on the gear box. The gear ratios determining the speed of each compressor stage is selected by selecting gear wheels 24, 25 and/or gear wheel 15. In order to make up for the chosen gear ratios the position of shaft 11 is chosen by positioning bearings 12 and 13 in such positions in mounting plates 9, 10 that acceptable cooperation between the gear wheels is obtained. Because the driving gear wheel is journalled in simple and inexpensive mounting plates the speed of the compressor stages can easily be changed by changing one or more gear wheels and replacing the mounting plates with new mounting plates having the new bearing positions. It is also easy to decrease possible misalignment between the driving gear wheel and a driven gear wheel by moving one of the mounting plates relative to the gear box, e.g. by rotating the mounting plate. The latter method works only when shaft 11 is in an off-center position in the mounting plates.

FIGS. 5-7 show some possibilities of mounting compressor stages on gear box 27. The gear box is provided with a number of mounting means 31, 32, 33 and 34. Of these, mounting means 32 and 34 have the same size. Mounting means 31 and 33 are shown with sizes which each differs from the size of mounting means 32, 34. Mounting means 31 and 34 are provided on a first side 36 of the gear box and mounting means 32 and 33 on a second opposite side 37 of the gear box. Compressor stage 4 of FIG. 5 is provided with a driven gear wheel 17. Holes 31, 32 are covered by cover plates 20. In FIG. 6 the gear box is provided with compressor stages 21, 22 being provided with driven gear wheels 24, 25. These stages are mounted on the second side 37 of the gear box. Compressor stages 22, 23 of FIG. 7 having driven gear wheels 25, 26 are mounted on the first side 36 of the gear box. During operation all mounting means or access openings are covered either by a compressor stage or a covering plate 20. Since the size of the mounting flange and the positions of the inlet and outlet are the same for several sizes of compressor stages, i.e. stages with different capacities, it is possible to use the gear box for an extensive range of compressor capacities. It is also possible to design the conduit system before the actual compressor capacity is determined and to reach bearings and seals on the gear box side of the compressor stage without removing any conduit.

In order to reach bearing 18 and seal 19, FIG. 1, for maintenance and possible replacement upper part 8 of the gear box and cover plate 20 are removed. Screws 16 are removed so that gear ring 15 can be lifted somewhat. After removal of driven gear wheel 17 bearing 18 and seal 19 can be reached through access opening 33. If the gear box is of the type shown in FIGS. 3 and 4 screws 30 securing the mounting plates to the lower part 27 of the gear box are removed so that upper part 28 of the gear box can be lifted together with the driving gear wheel journalled in the mounting plates 9, 10.

Bearing 18 and seal 19 are then reached in the same way as in the FIG. 1 embodiment. In FIG. 4 the driving gear wheel is shown as having a hub 14 and a gear ring 15. In this case a gear wheel mounted directly on the shaft 11 can be used instead.

I claim:

1. A gear box for a compressor plant comprising a pair of facially opposed sides (36, 37) defining a gear housing therebetween and providing journal means for a motor driven shaft (11) for rotating a driving gear wheel (15) in said gear housing, first mounting means (34) in one of said facially opposed sides, having an opening for accommodating a first compressor stage of predetermined size, said compressor stage having a shaft (38) rotatably supported in bearings means (18) in one of said facially opposed sides and carrying a driven gear wheel (17) meshing with said driving gear wheel (15) within said housing, said gear box being characterized by second mounting means (33) on the side opposite to said first mounting means and having an opening for alternatively accommodating a second compressor stage differing in size from said first compressor stage, each of said openings being of a size sufficient to facilitate access to said bearing means (18) and said driven gear wheel from the opposite one of said facially opposed sides, and a cover plate (20) covering said openings when not accommodating said compressor stages.

2. A gear box according to claim 1, in which said facially opposed sides are provided with a plurality of mounting means having openings for accommodating additional compressor stages (21, 22, 23) of varying sizes, alternatively, on one of said facially opposed sides.

* * * * *